United States Patent
Banaji et al.

(10) Patent No.: US 11,513,823 B2
(45) Date of Patent: Nov. 29, 2022

(54) CHAT INTERFACE FOR RESOURCE MANAGEMENT

(71) Applicant: ServiceNow, Inc., Santa Clara, CA (US)

(72) Inventors: Vani Banaji, Saratoga, CA (US); Chhavi Jain, Milpitas, CA (US); Sayali Ulhas Dongare, San Jose, CA (US); Dana Kotler, Palo Alto, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/224,273

(22) Filed: Dec. 18, 2018

(65) Prior Publication Data

US 2020/0192685 A1    Jun. 18, 2020

(51) Int. Cl.
*G06F 3/048* (2013.01)
*G06F 9/451* (2018.01)
*G06Q 30/02* (2012.01)
*H04L 51/02* (2022.01)
*H04L 51/224* (2022.01)

(52) U.S. Cl.
CPC ......... *G06F 9/453* (2018.02); *G06Q 30/0281* (2013.01); *H04L 51/02* (2013.01); *H04L 51/224* (2022.05)

(58) Field of Classification Search
CPC .... G06F 3/0484; G06F 17/30; G06F 17/3097; G06Q 40/08; H04L 12/58
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vampenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |

(Continued)

*Primary Examiner* — Rashawn N Tillery
(74) *Attorney, Agent, or Firm* — Fletcher Yoder PC

(57) ABSTRACT

The disclosed subject matter relates to a service application that supports a client device to access a platform via a client instance. The service application enables the user to perform an operation related to management of a virtual resource. In some embodiments, the service application invokes a chat interface to place the client device in communication with a virtual agent. Via the chat interface, the service application prompts the user to select a topic, an operation, and a virtual resource to indicate a desired operation to be performed. When the service application receives the selections made by the user via the chat interface, the service application, such as the virtual agent, may access the platform to perform the desired operation.

20 Claims, 12 Drawing Sheets

(56) References Cited

U.S. PATENT DOCUMENTS

| | | |
|---|---|---|
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,647,968 B2 | 5/2017 | Smullen et al. |
| 9,792,387 B2 | 10/2017 | George |
| 9,852,302 B2* | 12/2017 | Dv .................. G06F 21/45 |
| 10,740,568 B2* | 8/2020 | Azmoon ............ H04M 3/5133 |
| 10,769,826 B2* | 9/2020 | Azmoon ............ G06Q 10/06 |
| 2006/0026245 A1* | 2/2006 | Cunningham ......... H04L 51/04 |
| | | 709/206 |
| 2013/0042003 A1* | 2/2013 | Franco ............... G06F 9/45558 |
| | | 709/226 |
| 2014/0317701 A1* | 10/2014 | Eicken ............... H04L 63/102 |
| | | 726/5 |
| 2016/0085398 A1* | 3/2016 | Cifteli ................. G06F 3/0488 |
| | | 715/740 |
| 2016/0099892 A1* | 4/2016 | Palakovich .......... H04L 51/04 |
| | | 709/206 |
| 2016/0149790 A1* | 5/2016 | Zimmermann ..... G06F 9/45558 |
| | | 709/224 |
| 2016/0189077 A1* | 6/2016 | Azmoon .......... G06Q 10/06316 |
| | | 705/7.26 |
| 2017/0346768 A1* | 11/2017 | Wise .................. G06F 16/243 |
| 2018/0012232 A1* | 1/2018 | Sehrawat ............... G06F 21/31 |
| 2018/0083982 A1* | 3/2018 | Asenjo ................. H04L 67/12 |
| 2018/0219807 A1* | 8/2018 | Thinguldstad ........ H04L 51/02 |
| 2019/0012390 A1* | 1/2019 | Nishant ............. G06F 17/30867 |
| 2019/0097909 A1* | 3/2019 | Puri .................... H04L 41/5035 |
| 2019/0130310 A1* | 5/2019 | Madhava Rao ...... G06F 16/245 |
| 2019/0188269 A1* | 6/2019 | Chandrasekaran ..... H04L 51/02 |

* cited by examiner

CHAT INTERFACE FOR RESOURCE MANAGEMENT

TECHNICAL FIELD

The present disclosure relates generally to application operations, and more specifically, to a chat-based interface for use in management of information technology (IT) resources.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Cloud-based applications may be made available and accessed over a public or private cloud network. For example, a user may access the cloud network via a client device to perform a management operation on or using the cloud-based platform. In some cases, such an operation may involve a user attempting to remotely manage a device or application of the cloud network. In such instances, remote management of the device or application may be cumbersome or limited, such as having the user to invoke or utilize a management console or interface that may not be easily accessible from a remote location.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter relates to a service application that enables a user to perform an operation related to management of a cloud-based resource, such as a virtual resource. In some embodiments, the service application prompts the user for input, such as selecting a topic, selecting an operation, and selecting a resource on which to perform the operation. When the service application receives selections made by the user, the service application may remotely access the platform and enable the operation to be performed via the platform.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
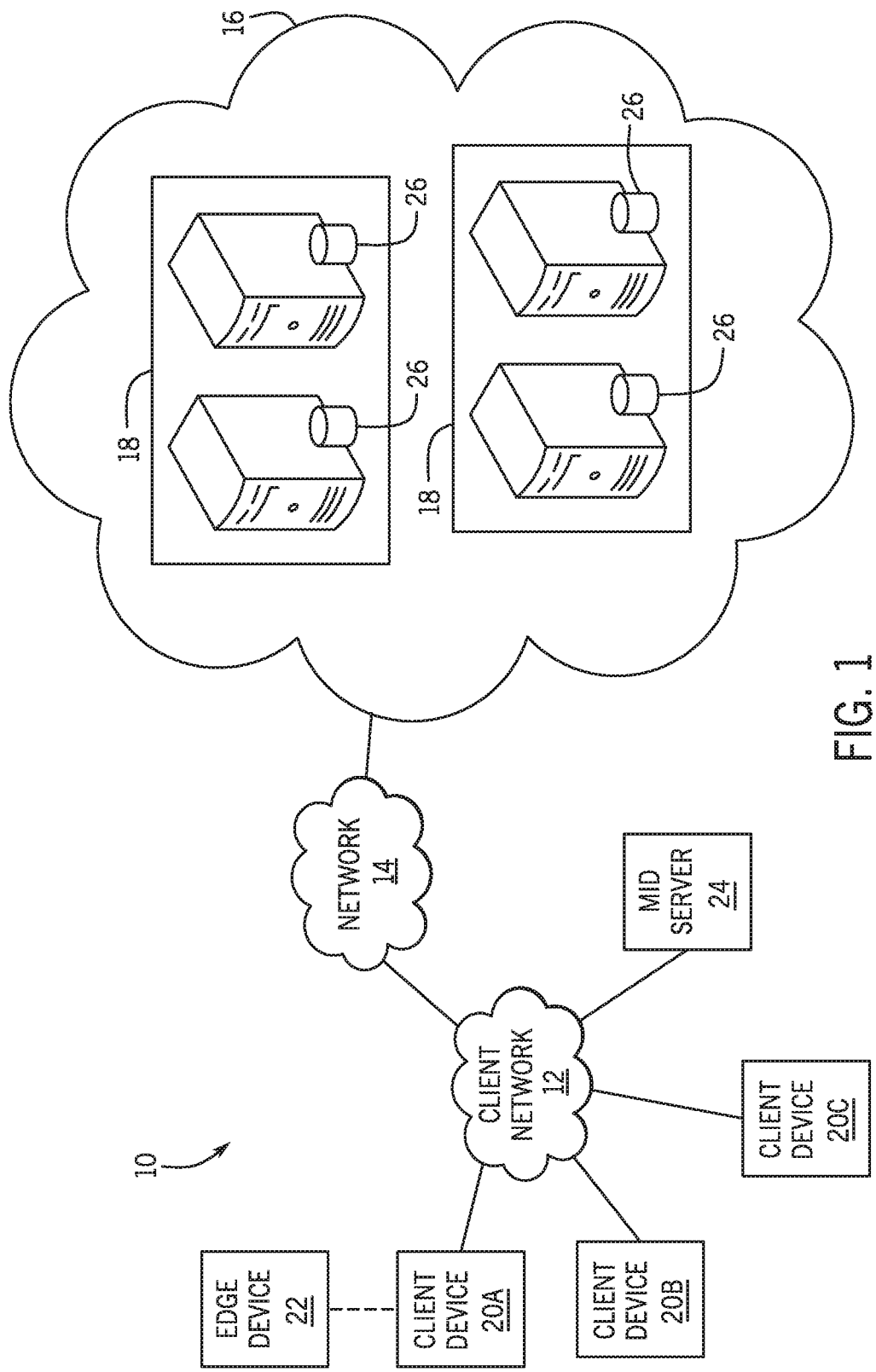
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "chat interface" refers to any interface, such as a graphical user interface (GUI), that simulates a message conversation between parties, such as in a natural language. The chat interface of the service application discussed in this application may display text-style messages to indicate an interaction between a user and agent (e.g., virtual agent) to perform an operation of a cloud-based application. The text-style messages may be indicative of an input made by the user (e.g., selection of a desired operation), a prompt for user input (e.g., a list of selectable operations), an operation performed by the service application (e.g., by the agent), and/or a status of the service application (e.g., currently performing a selected operation).

In the context of IT management, a user, such as an individual and/or an organization, may use a cloud-based application to perform various operations. For example, the user may use a cloud-based service application to allow virtual resources to be managed remotely (e.g., starting a virtual resource, stopping a virtual resource, purchasing a virtual resource, and the like). The user may use a client device on which the service application is running or interfaced with to perform such remote management operations. However, such approaches may be cumbersome or inconvenient, such as limiting the user to the use of certain devices or types of devices to perform remote resource management or employing interfaces that are complex or otherwise not intuitive.

With this in mind, and as discussed herein, a service application may facilitate the management of one or more resources by a user. For example, the service application provide or support a chat interface to facilitate interactions by the user via the client device to perform a desired operation. By way of example, in one implementation, the user may invoke the chat interface on a client device (e.g., a cellular telephone, tablet computer, laptop or desktop computer, and so forth) and enter instructions via the chat interface (e.g., a text entry and/or a selection of a defined option or object) to an agent. The agent then processes the inputs from the user and causes the actions to be performed by the service application. In this manner, use of the chat interface may enable the user to perform desired operations more easily than they could be performed on a conventional interface of the service application. In particular, the user may bypass performing actions such as submitting credentials to an interface, browsing an interface, navigating multiple screens or options to a desired action or resource, retracing navigated interfaces, and so forth, prior to performing a desired operation. Instead, the chat interface may simplify performing the desired operation by guiding the user to available resource and action options and parsing the selected inputs to enable the service application to perform the desired operation.

With the preceding in mind, the following figures relate to various types of generalized system architectures or configurations that may be employed to provide services to an organization employing a cloud-based framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
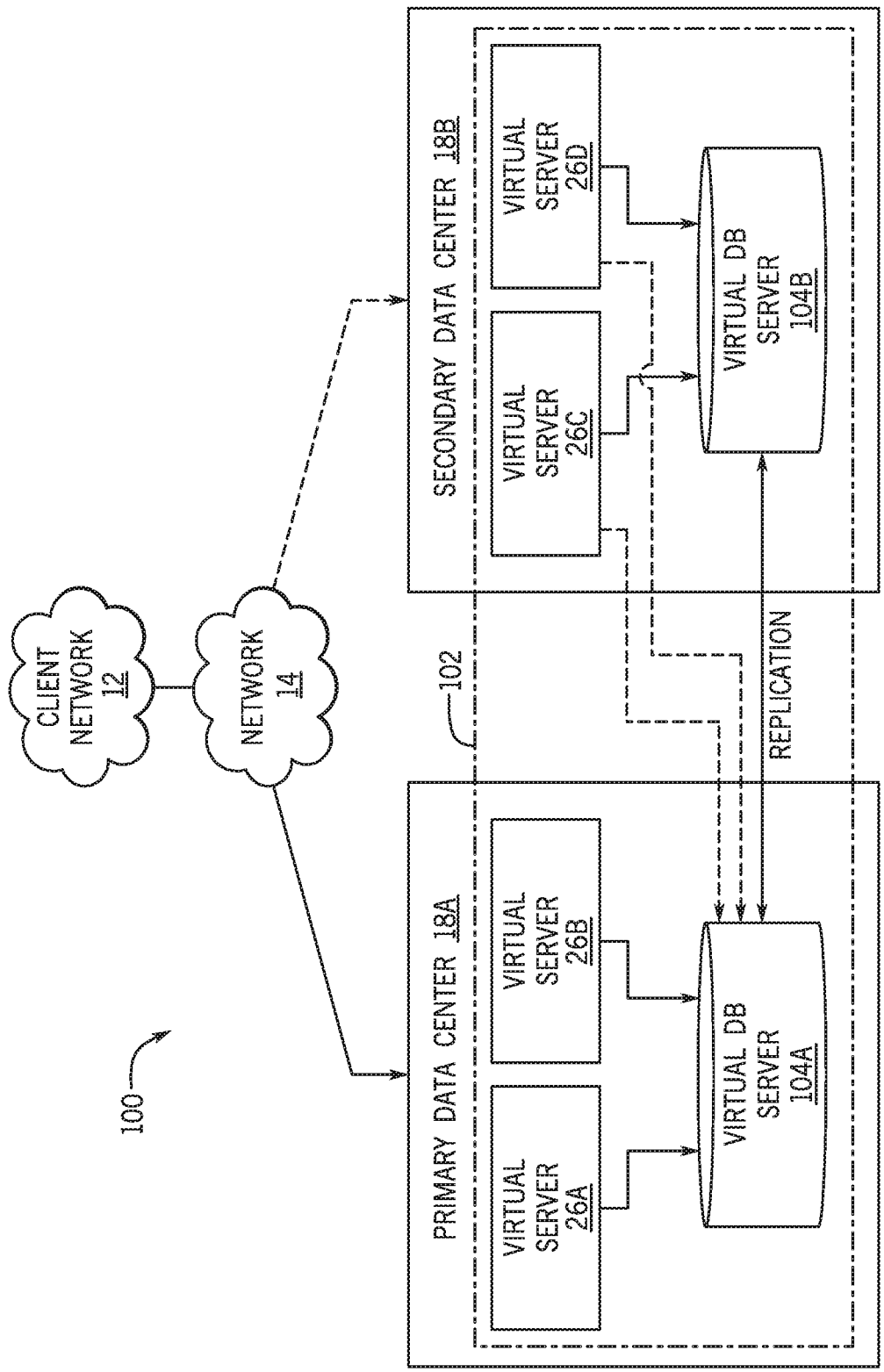
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
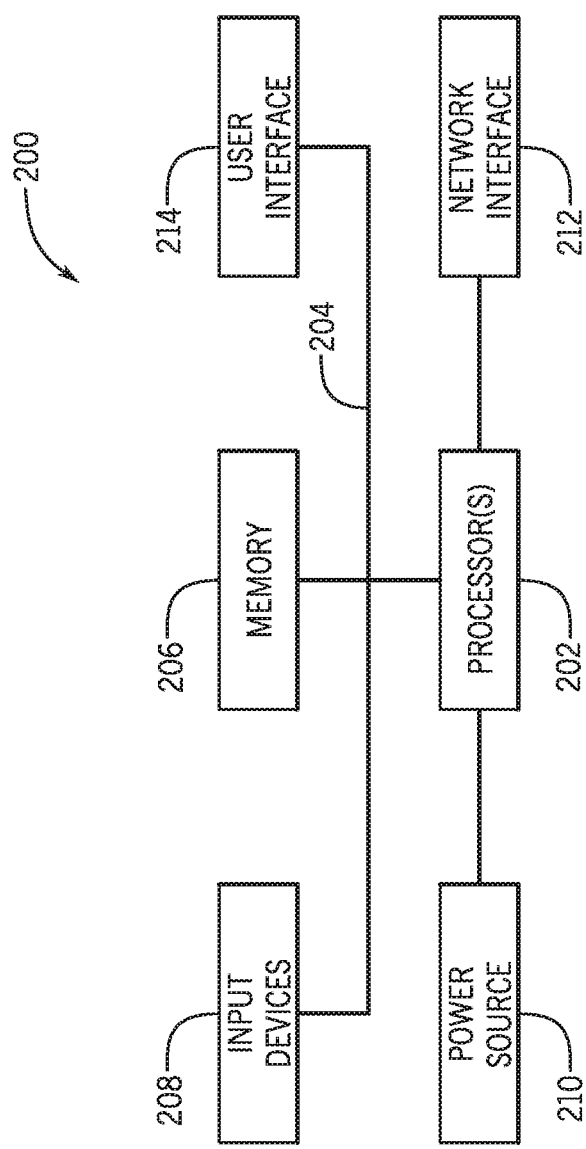
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
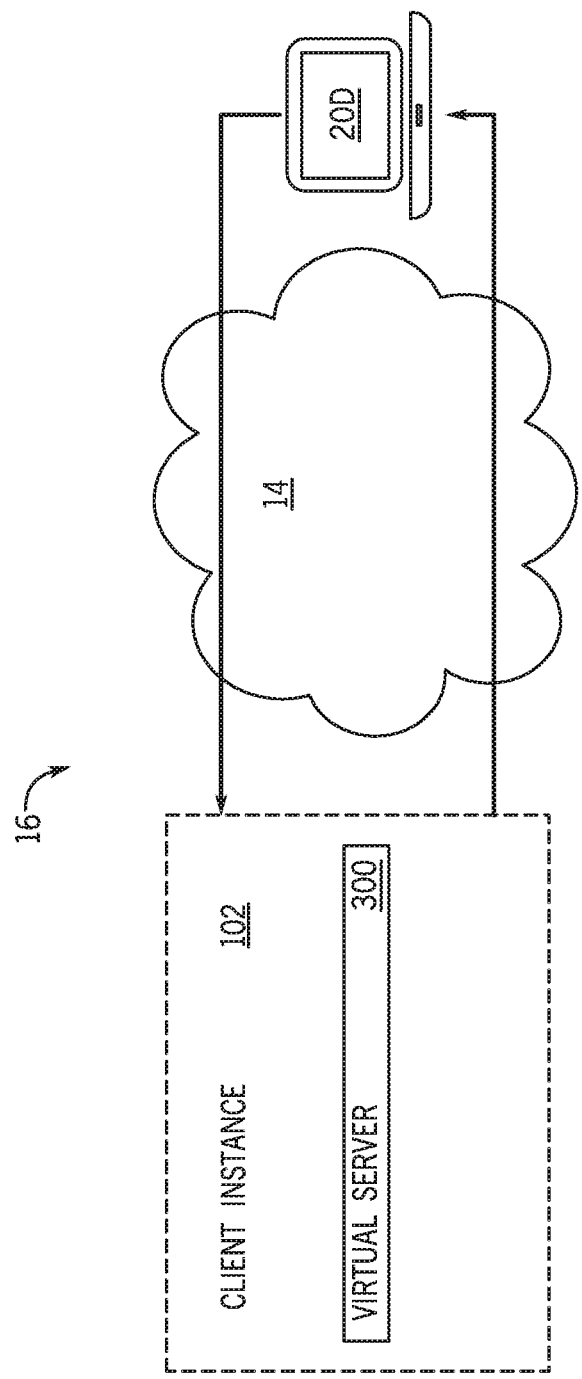
FIG. 4 is a block diagram illustrating an embodiment in which a virtual server supports and enables a client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. The client instance 102 may also be configured to communicate with other instances, such as the hosted instance 300 shown in FIG. 4, which may also include a virtual application server 26 and a virtual database server 104.

The client instance 102 may support the client device 20 to perform certain operations, such as operations associated with management of IT resources, including virtual resources. In some cases, the client device 20 may include a service application that supports a chat interface. The service application may, via the chat interface, facilitate the input of certain information and/or instructions, such as information or instructions associated with a specific resource and/or a particular operation. The service application may be accessed via a variety of different client devices 20, such as a laptop, a desktop computer, a cellphone, a tablet, and the like. Thus, the user may configure and/or cause to be performed a desired operation on one or more remote devices via a variety of methods. Although the present discussion primarily relates using the service application for operations associated with management of IT resources, such as virtual resources, it should be understood that the present approach may additionally or alternatively be used to perform other suitable operations, such as management of various types of resources in both an IT and non-IT context.

Figure 5:
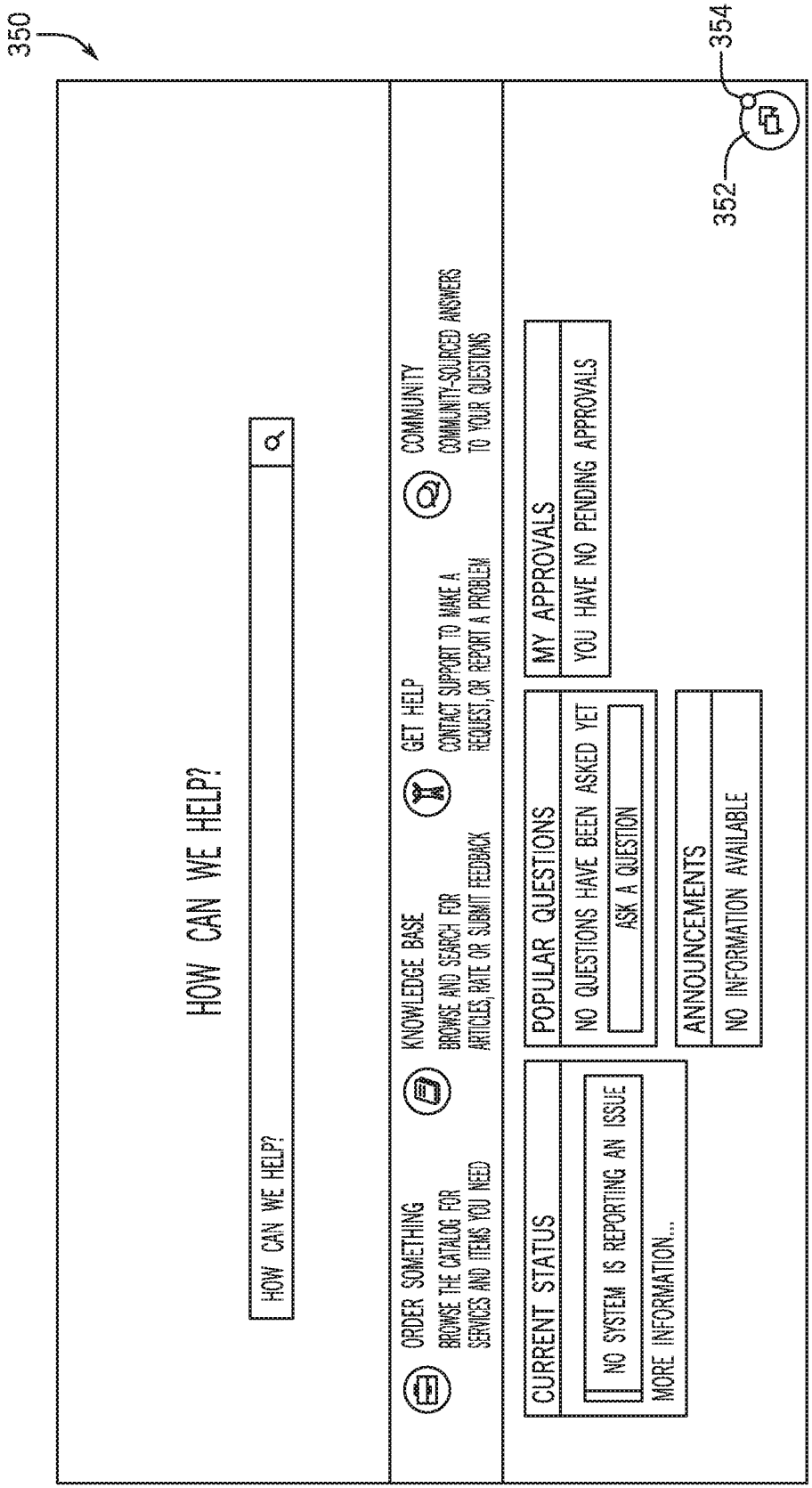
FIG. 5 is an embodiment of an interface in which a user may access a service application to perform operations associated with managing virtual resource, in accordance with aspects of the present disclosure.

With this in mind, FIG. 5 illustrates an embodiment of an interface 350, such as a graphical user interface (GUI), that may be presented on a client device 20 to enable the user to invoke a chat interface supported by a service application. In some embodiments, a user of the client device 20 may access the interface 350 via the Internet, such as via a web browser communicating over the Internet. In the depicted example, the interface 350 includes a chat icon 352 configured to invoke a chat interface of the service application when selected. Although FIG. 5 depicts the chat icon 352 as having a circular shape and positioned in a corner of the interface 350, the chat icon 352 may have any suitable shape and be positioned at any suitable location on the interface 350 for the user to view and select. In some embodiments, the chat icon 352 may be moveable or otherwise configurable by the user on the interface 350.

By way of example, the user may initiate or access the service application when the user desires to perform a certain operation, such as to remotely manage one or more virtual resources implemented on an IT platform managed by the user. Upon selection of the chat icon 352, a chat interface may be opened or otherwise displayed through which the user may communicate with an agent (e.g., a virtual agent) of the service application. As described herein, the agent may be an individual, a program, or an applet configured to prompt the user to input certain information corresponding to performing a desired operation, such as a resource management operation. In one example, the agent may be a programmed routine or module that is a part of the service application and that automatically communicates via the chat interface to both prompt user interactions and respond to user inputs or instructions by performing requested resource management operations. In a further example, the service application may initially place the client device 20 in communication with a virtual agent, but the service application may be configured to place the client device 20 in communication with a live agent if needed. That is, the user may determine that the virtual agent is not sufficient to perform the desired operation. Therefore, the user may send a user input (e.g., text input, selection of another icon) to be placed in communication with the live agent.

In certain embodiments, the chat icon 352 may include a notification indicator 354, which may, for example, indicate an unread notification or message sent by the agent, and/or that action is to be taken by the user. That is, the notification indicator 354 may enable the user to determine if there are unread communications and/or pending actions to be taken by the user that are relevant to interactions with the service application. In certain implementations, the notification indicator 354 may display a number indicative of a number of notifications (e.g., a number of unread messages or actions) associated with the service application, and/or may display a particular color indicative of a particular notification.

FIG. 5 illustrates the chat icon 352 displayed on an example of a help or support interface 350 that may be a particular web page accessible over the Internet. However, the chat icon 352 may be displayed on other interfaces, such as a different application screen or page, a different web page of the Internet, and so forth. In this manner, the chat icon 352 may be readily accessible by the user.

Figure 6:
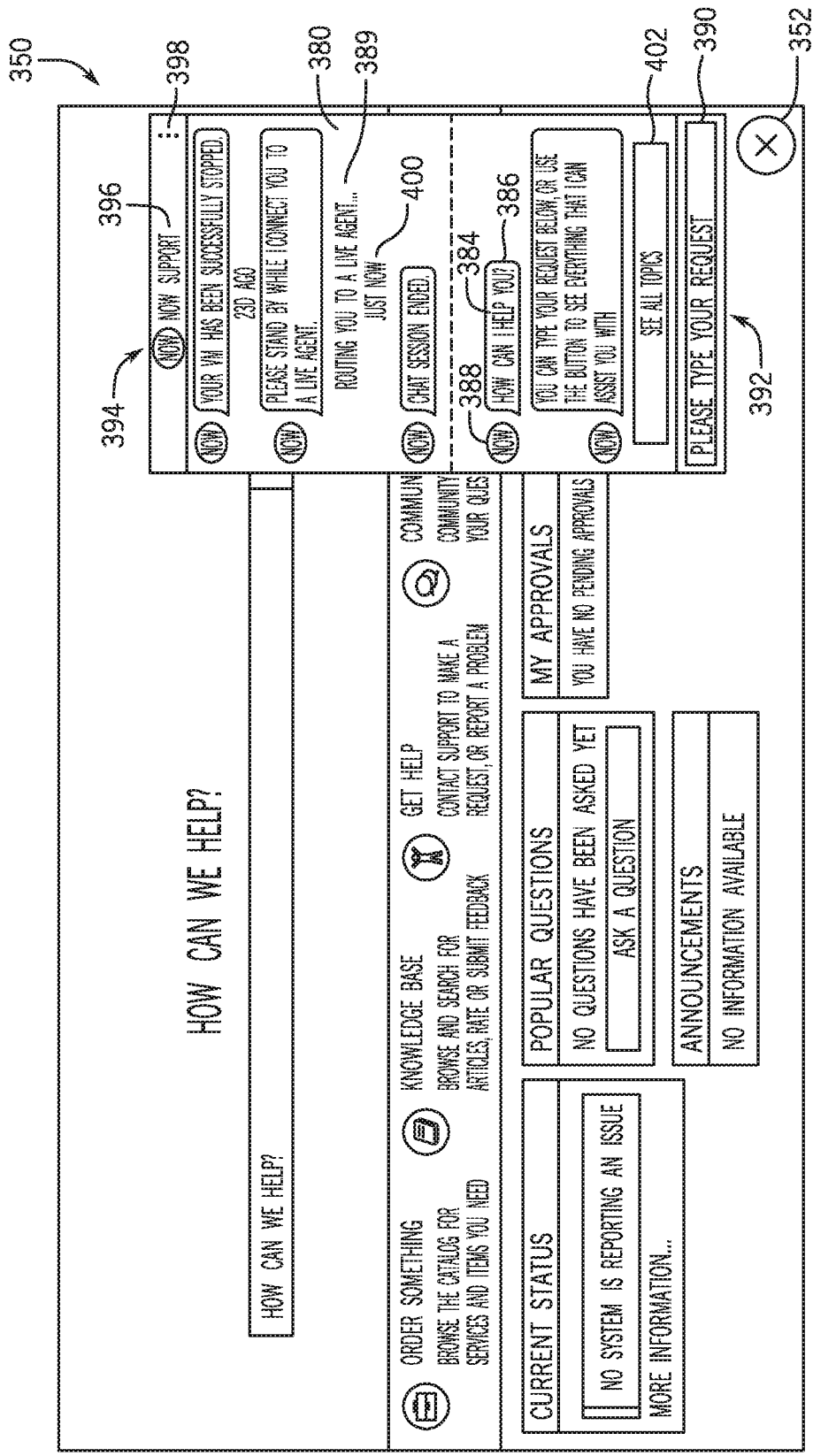
FIG. 6 is an embodiment of an interface that includes a chat invoke option of a service application, in accordance with aspects of the present disclosure.

FIG. 6 illustrates an embodiment of the interface 350 in which a chat interface 380 has been opened in response to selection of the chat icon 352. In general, the chat interface 380 may facilitate and/or guide the user to perform a desired operation. Though the chat interface 380 is shown in this example as displayed adjacent to the chat icon 352, it should be appreciated that the chat interface 380 may be moveable on the interface 350 by the user in some embodiments. Moreover, the chat interface 380 may be removed from being displayed on the interface 350 in response to a user command, such as by selection of the chat icon 352 again. That is, when the chat interface 380 is displayed on the interface 350, such as in FIG. 6, the user may exit out of the chat interface 380 by selecting the chat icon 352 or performing another such action.

In the depicted example, the chat interface 380 displays a sequence or series of messages 384 corresponding to the communications between the user and the agent, in which each message 384 is displayed as a text-style message within a message box 386. Additionally, for each sent message 384, the chat interface 380 may display an entity icon 388 to indicate the corresponding entity that sent the message 384. In certain embodiments, the respective messages 384 sent by different entities may be displayed in different manners. For example, a message 384 sent by a first entity may be displayed with a first color of text, a first text font style, a first text font size, a first shape of the message box 386, a first color of the message box 386, on a first side of the chat interface 380, or any combination thereof. A message 384 sent by a second entity that is different than the first entity may be displayed with a second color of text, a second text font style, a second text font size, a second shape of the message box 386, a second color of the message box 386, on a second side of the interface 380, or any combination thereof. Therefore, the user may easily distinguish messages 384 sent by different entities.

In addition to messages 384, the chat interface 380 may display a plurality of action statuses 389. Each action status 389 may indicate a particular action being performed in the chronological sequence, such as by the agent (e.g., inputting message), by the service application (e.g., connecting the user to the agent), by another application (e.g., performing a certain operation), and so forth. Each action status 389 may be displayed differently than the messages 384 to enable the user to distinguish between the action status 389 and the messages 384.

The chat interface 380 may include an input box 390 that enables the user to input information, such as when prompted by the agent or to prompt an action by the agent. In certain embodiments, the user may input text into the input box 390, but in additional or alternative embodiments, the input box 390 may include certain icons that the user may select to input information. In the illustrated embodiment, the input box 390 is displayed near a first end 392 of the chat interface 380, but the input box 390 may be displayed at any suitable location on the chat interface 380. Furthermore, at a second end 394 of the chat interface 380, which is opposite the first end 392, the chat interface 380 may include an agent icon 396 indicative of a particular agent with which the user is in communication. As an example, the agent icon 396 may include a name of the particular agent and/or an image representative of the particular agent. The chat interface 380 may also include an overflow icon 398 that enables the user to perform certain actions that are not currently displayed on the chat interface 380. That is, when the user selects the overflow icon 398, a menu of actions may be displayed. For example, the menu of actions may include adjusting display settings, deleting certain messages 384, undoing certain actions performed via the service application, placing the client device 20 in communication with a live agent, and the like.

In one implementation, each time the user initiates the service application, a new "session" of the chat interface 380 is initiated. Each session may be terminated upon completion of a desired operation as indicated by the user, or upon selection by the user to terminate the session. Certain embodiments of the chat interface 380 may display messages 384 of previous sessions associated with the particular user. In other words, if a particular user has previous sessions, messages 384 associated with a certain number of those sessions may be displayed on the chat interface 380. Furthermore, different sessions may each be associated with a particular user. That is, upon initiation of the service application, an identity of the user may be determined. Each chat session may be saved, archived, and/or designated to the determined identity and sessions associated with the determined identity may be displayed. With this in mind, the chat interface 380 may also display a time 400 indicative of when each message was sent. As such, the time 400 may enable the user to determine when previous messages were sent, such as when referencing past sessions.

In some embodiments, when the chat interface 380 is initiated, the agent prompts the user to indicate a specific topic that may be associated with the desired operation (e.g. an IT service or management operation). In the illustrated embodiment, the chat interface 380 includes a topics icon 402 that may be selectable by the user. When selected, the chat interface 380 may display a list of topic descriptors. In an additional or an alternative embodiment, the user may input text indicative of a desired topic, such as into the input box 390. The chat interface 380 may then display topic descriptors related to the inputted text, such as by matching the inputted text to a title, a category type, or other information associated with a particular topic.

Figure 7:
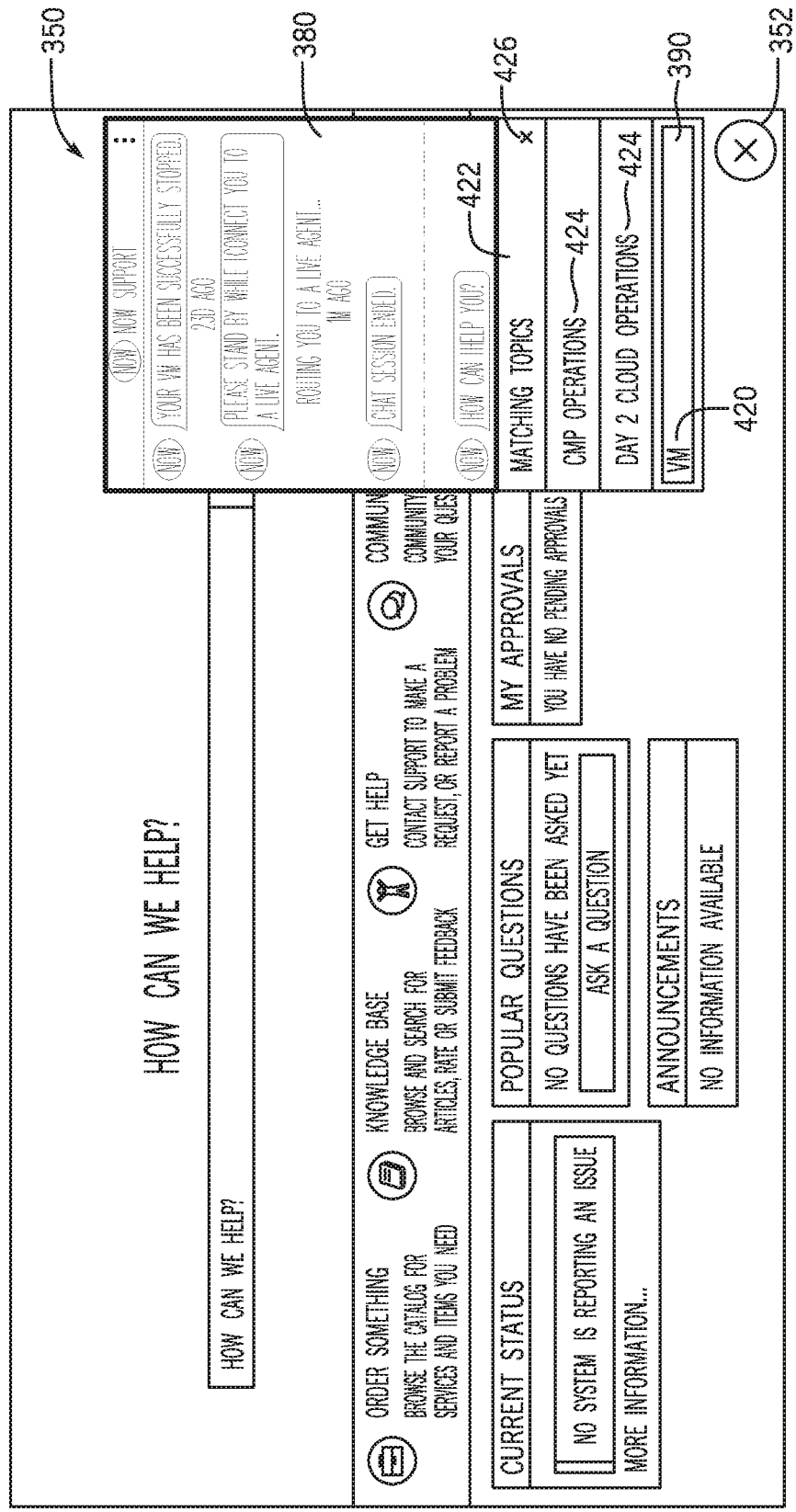
FIG. 7 is an embodiment of a chat interface of a service application in which a user may select a topic via the chat interface, in accordance with aspects of the present disclosure.

FIG. 7 illustrates an embodiment of the interface 350, in which the user has inputted text 420 via the input box 390 of the chat interface 380. As a result, a topics menu 422 is displayed on the chat interface 380. The topics menu 422 may display different topic descriptors 424 in a list format, in which each topic descriptor 424 corresponds to a possible topic associated with managing of virtual resources, and each topic descriptor 424 is selectable by the user. As indicated above, the topic descriptors 424 may be displayed on the topics menu 422 based on matching the inputted text 420 with information of each respective topic descriptor 424. In particular embodiments, the displayed topic descriptors 424 update in real-time with respect to the inputted text 420. In other words, as the user inputs text into the input box 390, the list of topic descriptors 424 may concurrently update. In additional or alternative embodiments, the displayed topic descriptors 424 update when indicated by the user, such as when the user selects another icon to update the topic descriptors 424 displayed on the chat interface 380.

In FIG. 7, the topics menu 422 is a separate interface that is superimposed on the chat interface 380. To this end, the topics menu 422 may also include an exit icon 426. When the user selects the exit icon 426, the topics menu 422 may be removed from display on the chat interface 380. As a result of selecting the exit icon 426, the service application may again prompt the user to indicate a topic, such as via the methods explained with respect to FIG. 6. In additional or alternative embodiments, the topics menu 422 may be displayed as one or more messages 384. That is, the agent may send one or more messages 384 that are each displayed on the chat interface 380, in which each of the messages 384 includes a topic descriptor 424 selectable by the user. In this manner, the topics menu 422 may not be considered a separate interface from the chat interface 380.

Figure 8:
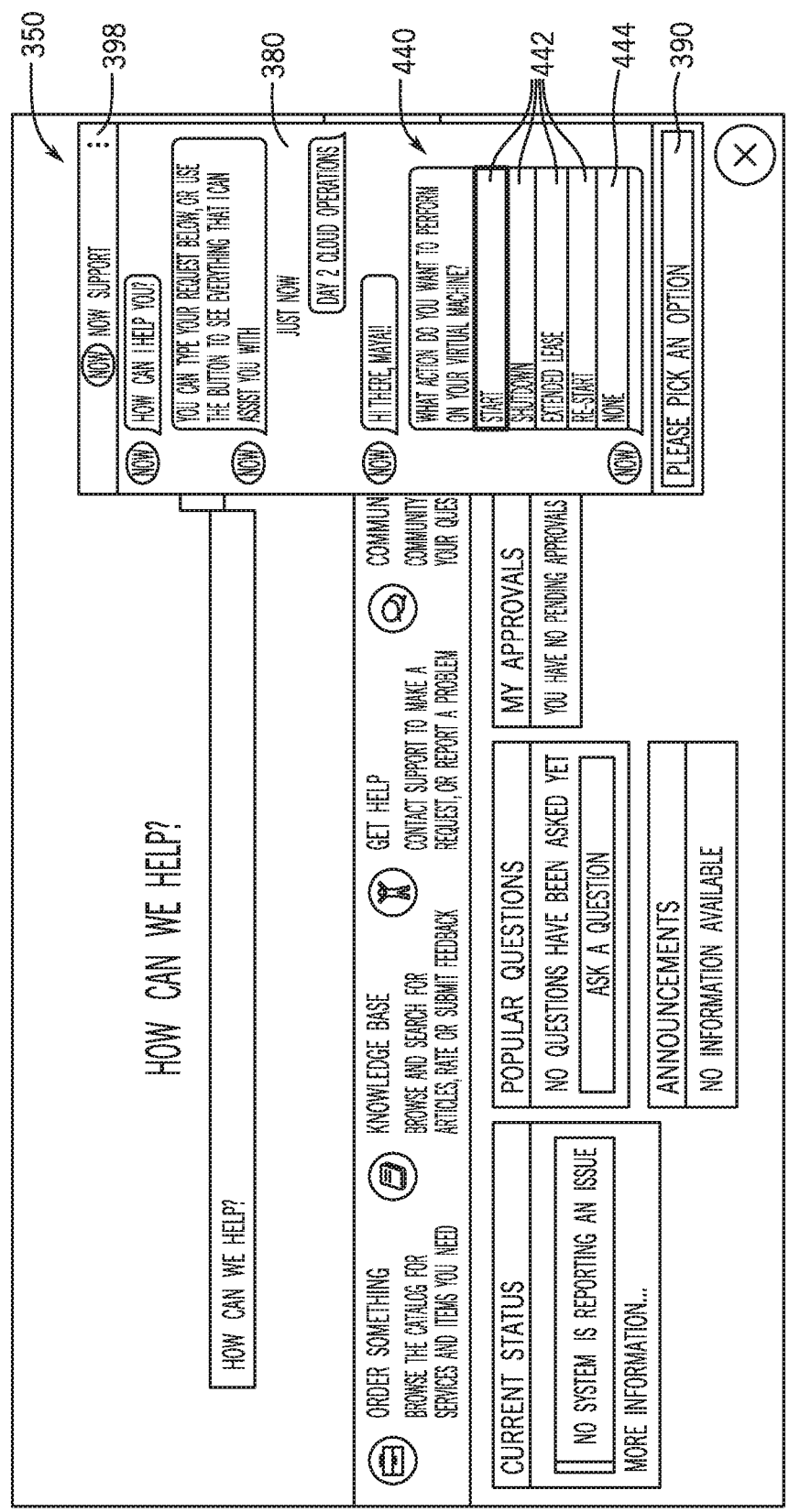
FIG. 8 is an embodiment of a chat interface in which a user may select an operation, in accordance with aspects of the present disclosure.

FIG. 8 illustrates an embodiment of the interface 350 with the chat interface 380 prompting the user to indicate a desired operation. By way of example, the illustrated embodiment of the chat interface 380 may be navigated when the user selects a topic descriptor 424 of FIG. 7. As a result, an operation menu 440 is displayed on the chat interface 380. As indicated in FIG. 8, the operation menu 440 is displayed via a message sent by the agent, in which the operation menu 440 includes a plurality of operation descriptors 442. Each operation descriptor 442 is associated with a possible operation related to a topic selected as described with respect to FIG. 6 that the user is able (e.g., permitted based on an identity of the user) to perform, and each operation descriptor 442 may be selectable by the user to indicate the particular operation desired by the user. For example, the operation descriptors 442 may include starting, shutting down, extending, restarting, another possible action, or any combination thereof, to be performed on a virtual resource. Additionally or alternatively, the user may input text into the input box 390 to indicate a selection of a desired operation. That is, rather than selecting an operation descriptor 442, the user may input text matching the desired operation, such as matching a name of an operation associated with a corresponding operation descriptor 442. In any case, upon indication of a desired operation, the chat interface 380 may update accordingly.

In certain embodiments, the operation menu 440 may include a "none" descriptor 444. The none descriptor 444 may be selected by the user to indicate that none of the operations of the displayed operation descriptors 442 are to be performed. As an example, the user may select the none descriptor 444 upon determining that an incorrect topic was selected from the topics menu 422. To this end, selection of the none descriptor 444 may enable the chat interface 380 to bring up the topics menu 422 such that the user may select a different topic.

Figure 9:
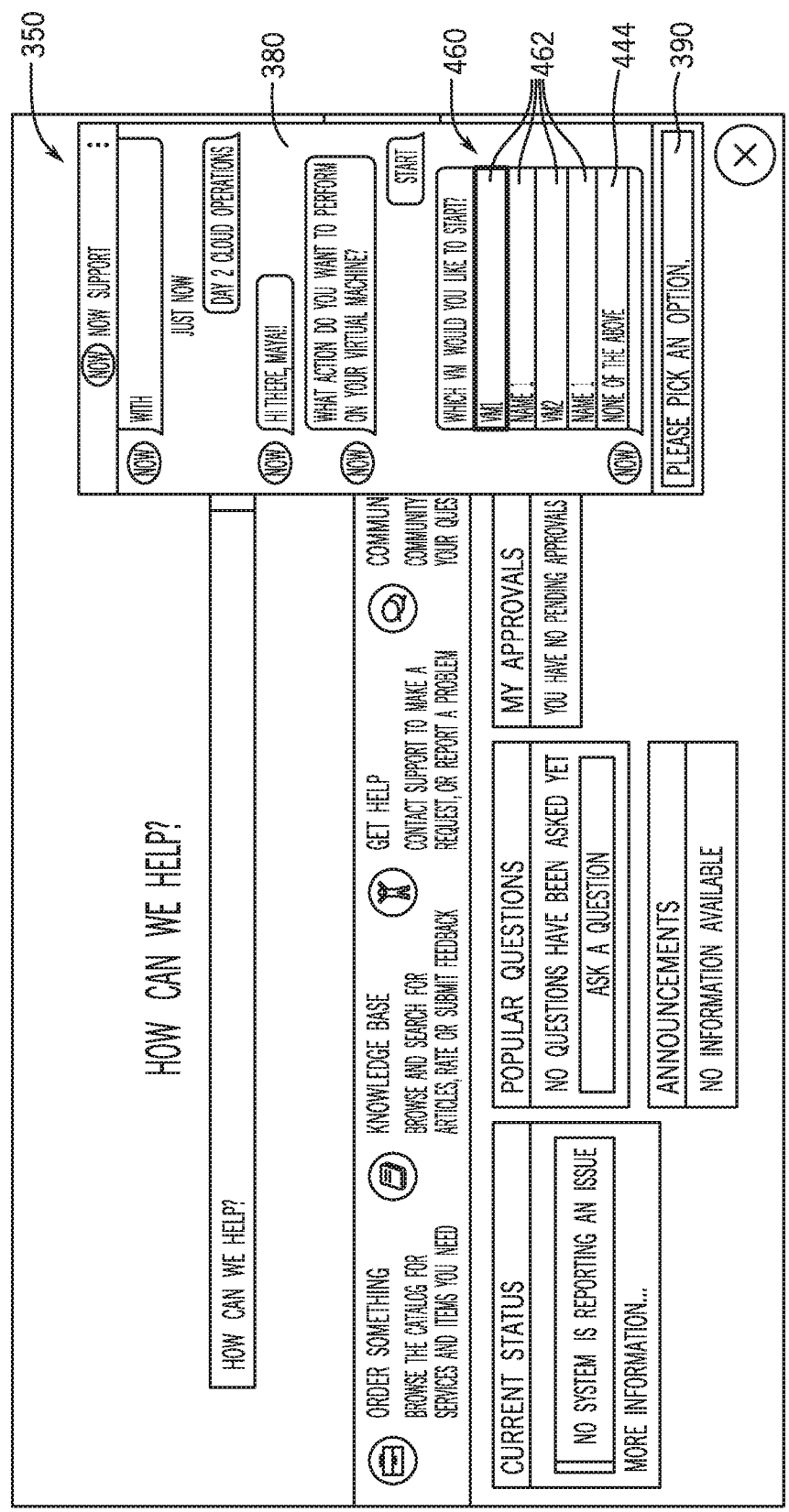
FIG. 9 is an embodiment of a chat interface in which a user may select a virtual resource, in accordance with aspects of the present disclosure.

Upon indication of an operation, the interface 350 may update. FIG. 9 illustrates an embodiment of the interface 350 that may be displayed after indication of a desired operation. The interface 350 includes the chat interface 380 prompting the user to indicate a particular resource on which to perform the desired operation. As an example, the chat interface 380 displays a resource menu 460 that may also be displayed via a message sent by the agent. The resource menu 460 may display resource descriptors 462, in which each resource descriptor 462 corresponds to a resource on which the desired operation may be performed. As should be understood, each resource descriptor 462 may be displayed based on a state of the corresponding resource. For example, if the desired operation is to start a resource and a particular resource is already in a started state, the resource descriptor 462 corresponding to the particular resource may not be displayed on the chat interface 380. Each resource descriptor 462 may be selectable by the user to indicate the desired resource. The user may additionally or alternatively input text into the input box 390 to indicate the desired resource. As with the operation menu 440, the resource menu 460 may also include the none descriptor 444. In this manner, the user may select the none descriptor 444 to navigate back to the operation menu 440, for example, and select a different operation.

Figure 10:
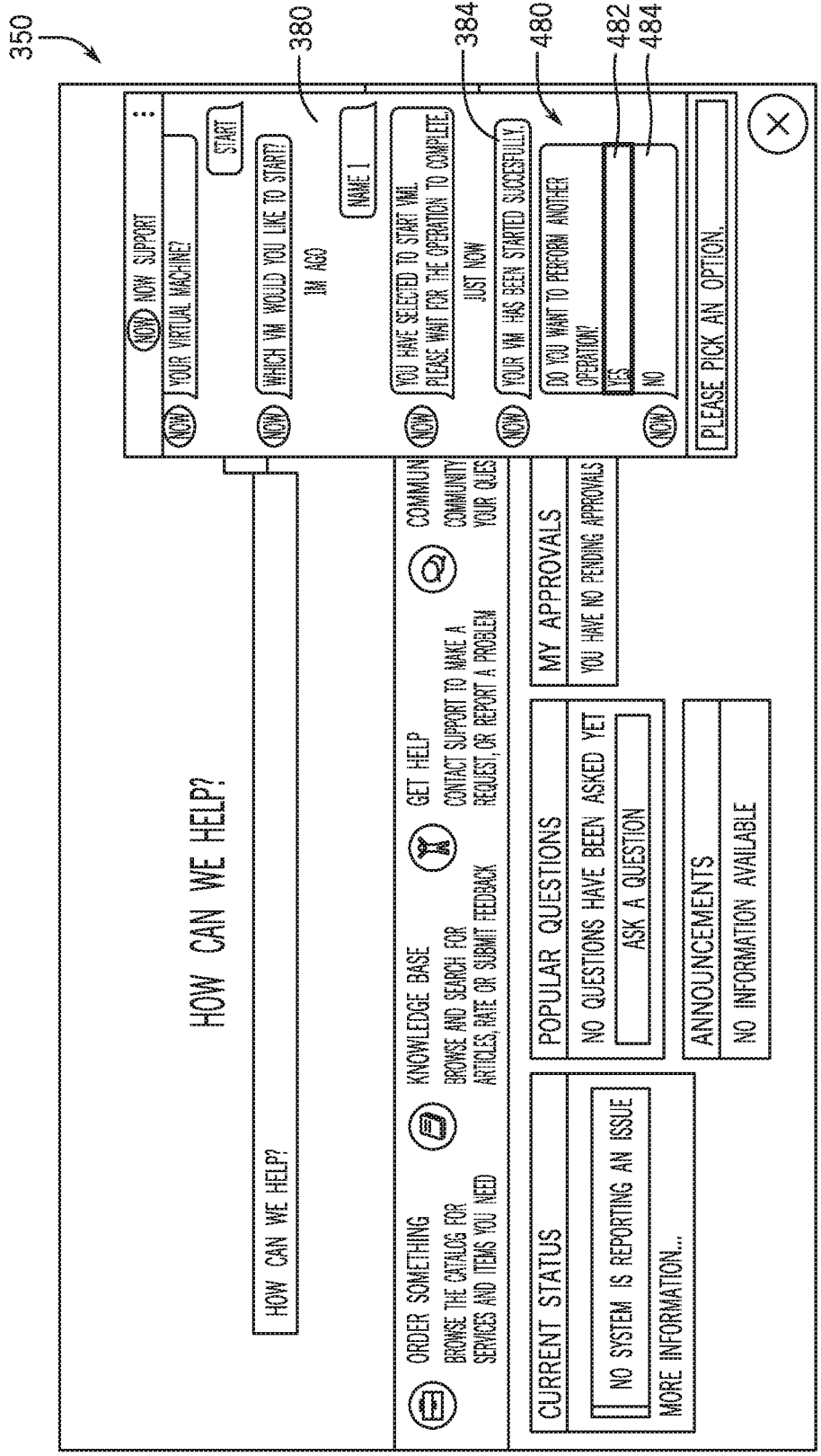
FIG. 10 is an embodiment of a chat interface of a service application in which a user may provide an indication if another operation is to be performed, in accordance with aspects of the present disclosure.

FIG. 10 illustrates an embodiment of the interface 350 after selection of a resource descriptor. As depicted in FIG. 10, the chat interface 380 may display messages 384 that indicate the desired operation has been completed. For example, after the operation and the resource has been indicated, the service application in communication with the client device 20 over the client instance may perform the selected operation. The chat interface 380 may also indicate when or if the selected operation is successfully performed. If the selected operation is not successfully performed, the chat interface 380 (e.g. via the virtual agent) may prompt the user to retry or re-enter information to perform the desired operation, and/or the chat interface 380 may display information associated with the unsuccessful performance, such as a selectable link that displays error information that may have caused the unsuccessful performance. Furthermore, the chat interface 380 may display an end menu 480 that prompts the user to indicate if another operation is desired to be performed. In some embodiments, the end menu 480 may include a yes descriptor 482 and a no descriptor 484. Upon selection of the yes descriptor 482, the chat interface 380 may update, such as to prompt the user to indicate a topic, as described with respect to FIG. 6. Upon selection of the no descriptor 484, the session may end and/or the chat interface 380 may be removed from display on the interface 350.

While FIGS. 8-10 depict the operation menu 440, the resource menu 460, and the end menu 480 each being displayed as a message 384 in the chat interface, in additional or alternative embodiments, the operation menu 440, the resource menu 460, and/or the end menu 480 may be displayed as a separate interface superimposed on the chat interface 380, similar to the topics menu 422 of FIG. 7. Additionally or alternatively, although FIGS. 6-10 depict the chat interface 380 as being superimposed on the interface 350, it should be understood that the chat interface 380 may be displayed without the interface 350. In other words, the chat interface 380 may be a GUI invoked in an application, such as an application (e.g., a $3^{rd}$ party messaging application integrated with the cloud-based platform 16) for a mobile phone, a tablet, and/or a computer. The GUI may open upon initiation of the application and thus, the user does not have to navigate to the interface 350 and/or select the chat icon 352 to initiate the chat interface 380. Further, it should be understood that the depicted interfaces may be displayed in other suitable manners that are not illustrated in FIGS. 5-10, including with different icons and/or descriptors, with additional icons and/or descriptors, with alternative positioning of icons and/or descriptors, and so forth.

Figure 11:
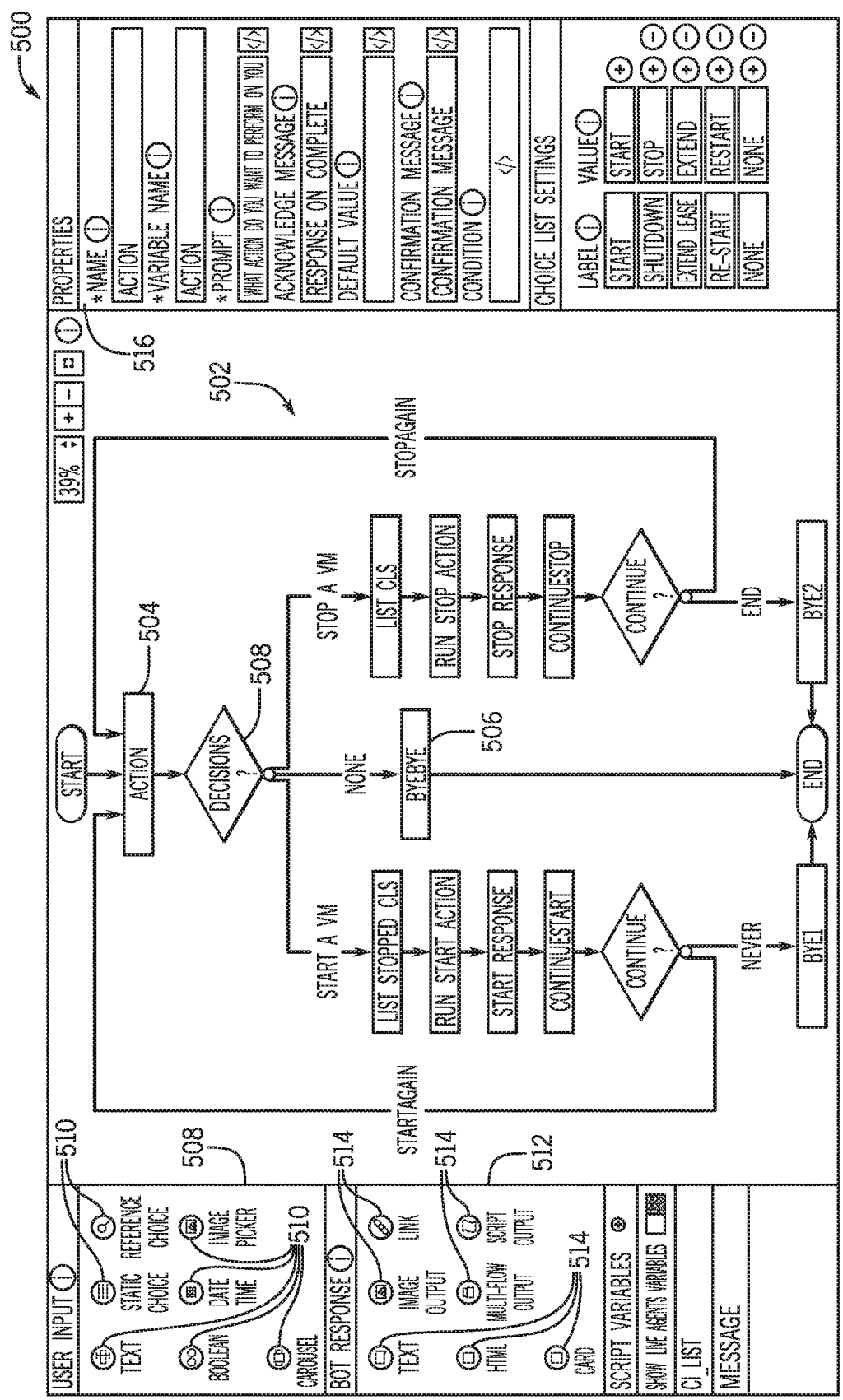
FIG. 11 is an embodiment of a flow designer in which features of the chat interface of FIGS. 6-10 may be designed, in accordance with aspects of the present disclosure.

FIG. 11 illustrates an embodiment of a flow designer interface 500 that may be used to design a sequence of communications steps that may be implemented or navigated via the chat interface described herein. For example, a user of the flow designer interface 500 may adjust how information is prompted via the chat interface 380. As should be understood, a user of the flow designer interface 500 may not be a user of the service application but may instead be a designer tasked with designing or editing service operations or tasks that may be performed by a user of the chat interface described herein. In some cases, the user of the flow designer interface 500 may be granted approval to edit the flow designer interface 500. In some embodiments, the flow designer interface 500 may include an outline 502 configured to display an overview of a current flow of the chat interface 380. In other words, the outline 502 indicates how the chat interface 380 may be displayed when a session of the chat interface 380 is initiated. Furthermore, the outline 502 may indicate how a flow of the chat interface 380 may be updated in response to a user input. The outline 502 may include input icons 504 indicative of the chat interface 380 prompting for user input, and the outline 502 may include response icons 506 indicative of the chat interface 380 responding to user input, such as sent messages via the agent. The outline 502 may also include action icons 508 that indicate when an action is being performed, such as when the service application is processing a decision made based on the user input, when the service application is communicating with a virtual server 26 to perform a desired operation, and so forth.

Properties of the input icon 504, response icon 506, and/or action icon 508 may be adjustable by the user. As an example, the flow designer interface 500 may include an input menu 508. The input menu 508 may include all possible types of input icons 504 that are available to be implemented in the service application. For example, the input menu 508 may include input descriptors 510, such as text input, list input, search input, Boolean input, image input, carousel input, another suitable type of input descriptor 510, or any combination thereof. The flow designer interface 500 may also include a response menu 512. The response menu 512 may include all possible types of response icons 506 that are available to be implemented in the service application on which the chat interface 380 may display after receiving input. Each response icon 506 may be represented by a response descriptor 514 on the response menu 512, and may include text, link, card, script, image, other suitable types of response descriptor 506, or any combination thereof.

The user may implement any input descriptor 510 and/or any response descriptor 514 into the service application via the outline 502. By way of example, the user may position a particular input descriptor 510 or response descriptor 514 in the corresponding location on the outline 502, such as by dragging and dropping the input descriptor 510 or response descriptor 514. Accordingly, a flow of which the chat interface 380 may prompt for user input and/or response to user input is adjusted. In addition, information of each descriptor 510, 514 may also be adjusted. As an example, the flow designer interface 500 may include a property menu 516 that initiates upon selection of a particular descriptor 510, 514. Via the property menu 516, the user may change information associated with the particular descriptor 510, 514, including a name of the descriptor 510, 514 on the outline 502, how the descriptor 510, 514 prompts for an input on the chat interface 380, how the descriptor 510, 514 acknowledges an input on the chat interface 380, and the like. In additional or alternative embodiments, the user may adjust certain functional properties of the particular descriptor 510, 514 via the property menu 516, such as copying the particular descriptor 510, 514, removing the particular descriptor 510, 514, and/or moving a location of the particular descriptor 510, 514 on the outline 502.

In particular embodiments of the flow designer interface 500, the service application may update based on changes made in the flow designer interface 500. That is, the chat interface 380 of each service application may incorporate changes made in the flow designer interface 500 to match the updated outline 502. In certain embodiments, each service application may include the same chat interface 380. In other words, the chat interface 380 of each service application may be based on the same embodiment of the outline 502 designed via the flow designer interface 500. In additional or alternative embodiments, different service applications may include different embodiments of the chat interface 380. For example, the user of the flow designer interface 500 may incorporate a particular embodiment of the outline 502 to service applications of a mobile device and another embodiment of the outline 502 to service applications of a computer. Thus, the chat interface 380 of the service application of mobile devices may be different than the chat interface 380 of the service application of computers.

Figure 12:
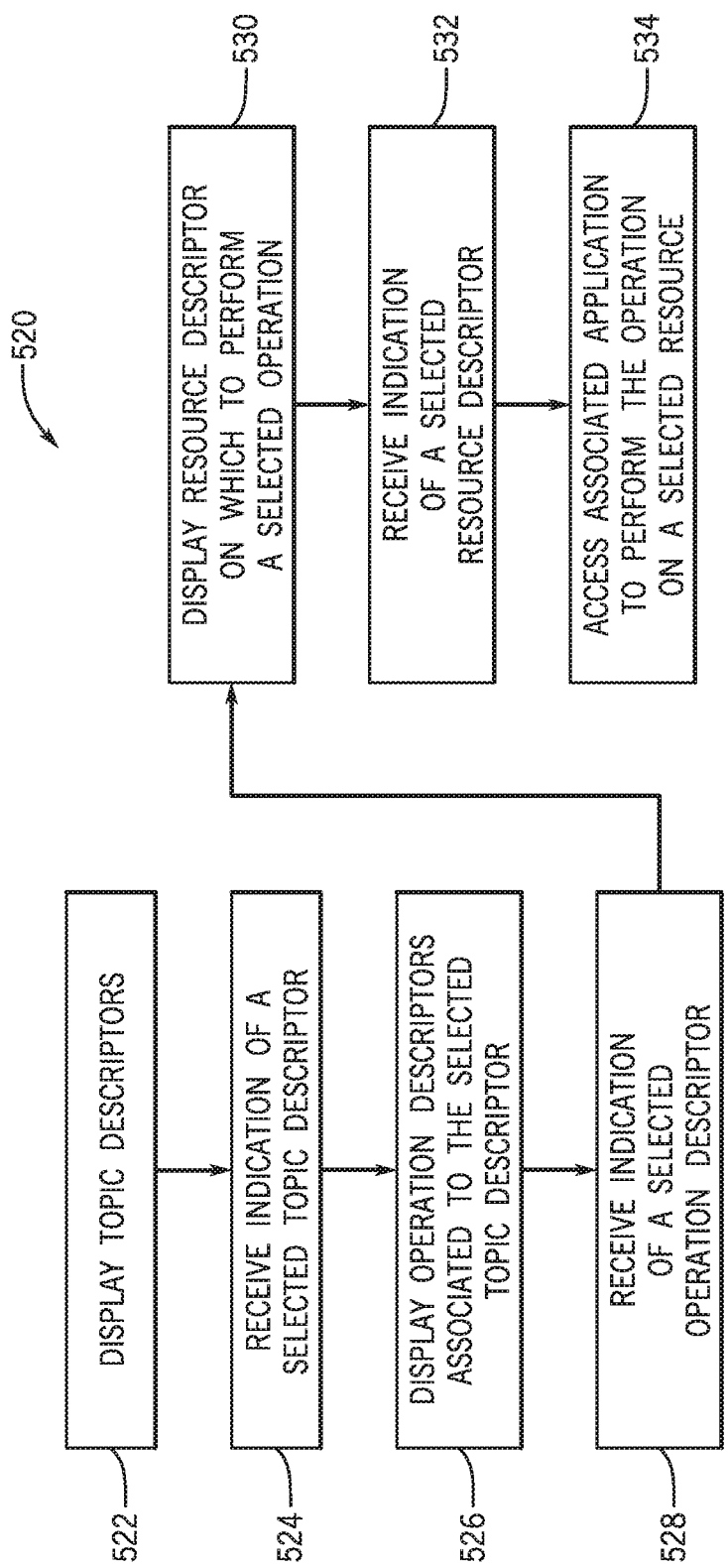
FIG. 12 is a block diagram of a method in which a service application may perform an operation indicated by a user, in accordance with aspects of the present disclosure.

FIG. 12 is a block diagram illustrating an embodiment of a method 520 that may be performed by the service application to perform an operation based on interactions of a user with a chat interface as described herein. The method 520 generally summarizes the procedures performed by the service application as described in FIGS. 5-10 via the chat interface 380, which may be based on a non-limiting embodiment of the outline 502. At block 522 of the method 520, upon initiation of the service application, topic descriptors 424 may be displayed on the chat interface 380. In general, each topic descriptor 424 corresponds to a topic that may be associated with a certain category of which the user may manage virtual resources, such as lifecycle operations (e.g., operations to manage a status of a virtual resource), computational operations, and the like. In some embodiments, all topic descriptors 424 may be displayed when the service application is initiated, such as via a list, a table, and/or any other suitable method. In additional or alternative embodiments, a portion of all topic descriptors 424 may be displayed, such as based on a frequency of selection by the user. In further embodiments, the user may search, browse, and/or navigate displayed topic descriptors 424 to locate a particular topic descriptor 424.

At block 524, the service application receives an indication of a topic descriptor 424 as selected by the user. The topic descriptor 424 may be selected via a keyword search, a keyword match, a selection from a list of displayed topic descriptors, another method, or any combination thereof. As an example, the user may use the client device 20 to select (e.g., via a stylus, a computer mouse) a topic descriptor 424 displayed on the chat interface 380.

Upon receiving the selected topic descriptor 424, the service application may display operation descriptors 442 associated with the selected topic descriptor 424 that the user is able or allowed to perform, as indicated at block 526. That is, the service application may determine possible operation descriptors 442 that may be performed based on the selected topic descriptor 424. The service application may then display the determined operation descriptors 442 on the chat interface 380, such as in a manner described at block 522 for displaying topics.

At block 528, the service application receives an indication of a selected operation descriptor 442, which may be in a manner similarly described at block 524. That is, the user may select an operation descriptor 442 displayed on the chat interface 380 via the client device 20, and the service application receives the indication of the selected operation descriptor 442.

At block 530, the service application determines and displays resource descriptors 462 on which the operation associated with the selected operation descriptor 442 may be performed, which may be in a manner described above. In this manner, the resource descriptors 462 displayed on the chat interface 380 are associated with both the topic descriptor 424 selected at block 524 and the operation descriptor 442 selected at block 528. In some embodiments, a name of each resource descriptor 462 may be displayed on the chat interface 380. In additional or alternative embodiments, other information of each resource descriptor 462 may be displayed, such as an identifier (e.g., assigned code), a date and/or time provisioned, other information, or any combination thereof. Thus, the user may better determine the desired resource descriptor 462.

At block 532, the service application receives an indication of a selected resource descriptor 462, which may be in a manner described above. Thus, the service application may have information associated with the selected operation descriptor 442 and the selected resource descriptor 462, which may enable the service application to perform the desired operation as indicated by the user.

Using information selected by the user (e.g., the operation descriptor 442, the resource descriptor 462), the service application may access a different application, as shown at block 534. That is, the service application may determine an appropriate application, which may be stored in the cloud-based platform 16, to perform the operation associated with the operation descriptor 442 on the resource associated with the desired resource descriptor 462. After accessing the appropriate application, the service application may instruct the application to operate and complete the operation as desired by the user.

In some cases, the service application may not be able to perform the desired operation. For example, the service application may not be able to determine an appropriate application of the cloud-based platform 16 to perform the desired operation. As a result, the chat interface 380 may display a message indicative that the desired operation was not completed. In some embodiments, the chat interface 380 may also display a reason of which the desired operation was not completed to facilitate the user in completing the desired operation.

It should be appreciated that the method 520 is a non-limiting embodiment for the service application to perform an operation desired by the user. Indeed, additional steps not depicted in FIG. 11 may be performed, such as steps before block 522, after block 534, and/or between any of the blocks of FIG. 11. As an example, after block 534, the service application may determine if the user desires another operation to be completed, and in response, the service application may repeat the steps of the method 520. Furthermore, it should be appreciated that certain steps may be performed in a different order and/or in a different manner. In one example, the service application may display resource descriptors 462 and receive an indication of a selected resource descriptor 462 prior to displaying operation descriptors 442 and receiving an indication of a selected operation descriptor 442. In another example, rather than receiving an indication of one selection (e.g., one selected operation descriptor 442 or one selected resource descriptor 462), the service application may enable the user to make multiple selections. Therefore, in one iteration of the method 520, multiple operations may be performed.

It should also be appreciated that certain steps of the method 520 may be performed based on the user of the service application. For example, the service application may determine an identity of the user, such as via a login credential. Based on the identity of the user, the method 520 may be performed in a certain manner, such as displaying particular operation descriptors 442 and/or particular resource descriptors 462 on the chat interface 380, displaying the chat interface 380, and the like. In other words, a certain embodiment of the chat interface 380 may be initialized based on the identity of the user. In this manner, different users may interact with the chat interface 380 differently. That is, the different embodiments of the chat interface 380 may enable different users to use the chat interface 380 in a manner preferred by the respective users. Additionally or alternatively, certain features of the chat interface 380 may be available to different users based on the identity. Such features may include particular topic descriptors 424, operation descriptors 442, and/or resource descriptors 462, and/or certain functions of the chat interface 380.

In particular embodiments, the method 520 may be performed with respect to the computing system 10 of FIG. 1. That is, the service application may user input from any of the client devices 20A, 20B, 20C via the client network 12 and/or the network 14. Furthermore, the service application may be in communication with the cloud-based platform 16 to access the application and perform the desired operation.

The disclosed subject matter may, in some embodiments, be a service application that supports a client device to access a platform via a client instance. The service application enables the user to perform an operation related to management of a virtual resource. In some embodiments, the service application prompts the user to select a topic, an operation, and a virtual resource. When the service application receives the selections made by the user, the service application may access the platform, in which the service application enables the operation to be performed via the platform. For example, the service application may determine an appropriate application stored on the platform based on the selections made by the user, and the service application may use the determined application to complete the operation selected by the user. In this manner, the service application may enable the user to perform the desired operation efficiently. That is, the service application may automatically perform the operation upon receiving information from the user, without the user having to navigate through the client device. Additionally, the service application may be readily accessible by the user at any client device. Therefore, the user may be able to perform the desired operations at any location and/or time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a client instance hosted by a platform, wherein the client instance comprises a plurality of virtual machines configured to provide services of the client instance to a plurality of client devices communicatively coupled to the client instance, wherein the client instance comprises a service application accessed via a client device of the plurality of client devices, wherein the service application comprises a chat interface and is configured to support management of the plurality of virtual machines by performing operations comprising:
  determining an identity of a user associated with the client device;
  providing, via the chat interface, a list of selectable topic descriptors representing a plurality of information technology (IT) management topics associated with the management of a first set of virtual machines of the plurality of virtual machines, wherein the list of selectable topic descriptors is determined based at least in part on the identity of the user, and wherein different user identities of a plurality of user identities are provided different selectable topic descriptors associated with the management of different sets of virtual machines of the plurality of virtual machines;
  receiving, via the chat interface, a selection of a topic descriptor from the list of selectable topic descriptors, and in response, determining a plurality of IT management operations associated with a particular topic represented by the selected topic descriptor, wherein the plurality of IT management operations comprise management operations associated with the first set of virtual machines;
  providing, via the chat interface, a list of selectable operation descriptors representing the plurality of IT management operations;
  receiving, via the chat interface, a selection of an operation descriptor from the list of selectable operation descriptors, wherein the selected operation descriptor represents a particular operation of the plurality of IT management operations; and
  performing, via the service application, the particular operation on the first set of virtual machines.

2. The system of claim 1, wherein the service application is configured to provide a chat icon on the client device, wherein the chat interface is provided in response to a user selection of the chat icon.

3. The system of claim 1, wherein the service application is configured to:
receive, via the chat interface, an input text string from the client device; and
in response to the input text string, determine the list of selectable topic descriptors based at least in part on the input text string.

4. The system of claim 1, wherein the chat interface places the client device in communication with a virtual agent of the service application, and wherein the virtual agent is a programmed routine or module of the service application configured to automatically communicate via the chat interface via text-style messages.

5. The system of claim 1, wherein, upon receiving a user input, the service application is configured to place the client device in communication with a live agent.

6. A system, comprising:
a plurality of virtual machines communicatively coupled to a client instance and configured to provide one or more services, via the client instance, to a plurality of client devices communicatively coupled to the client instance, wherein the client instance comprises a service application accessed via a client device of the plurality of client devices, wherein the service application comprises a chat interface and is configured to support management of the plurality of virtual machines by performing operations comprising:
  determining an identity of a user associated with the client device;
  providing, via the chat interface, a list of selectable topic descriptors representing a plurality of information technology (IT) management topics associated with the management of a first set of virtual machines of the plurality of virtual machines, wherein the list of selectable topic descriptors is determined based at least in part on the identity of the user, and wherein different user identities of a plurality of user identities are provided different selectable topic descriptors associated with the management of different sets of virtual machines of the plurality of virtual machines;
  receiving, via the chat interface, a selection of a topic descriptor from the list of selectable topic descriptors, and in response, determining a plurality of IT management operations associated with a particular topic represented by the selected topic descriptor, wherein the plurality of IT management operations comprise management operations associated with the first set of virtual machines;

providing, via the chat interface, a list of selectable operation descriptors representing the plurality of IT management operations;

receiving, via the chat interface, a selection of an operation descriptor from the list of selectable operation descriptors, wherein the selected operation descriptor represents a particular operation of the plurality of IT management operations; and performing, via the service application, the particular operation on the first set of virtual machines.

7. The system of claim 6, wherein the service application is configured to:

provide a topics icon on the chat interface in response to the chat interface being invoked; and provide the list of selectable topic descriptors on the chat interface in response to a selection of the topics icon.

8. The system of claim 6, wherein receiving the selection of the topic descriptor, receiving the selection of the operation descriptor, or both, comprise receiving a string of text as input via the chat interface.

9. The system of claim 6, wherein the service application is configured to provide a notification indicator on a chat icon to indicate an unread communication displayed on the chat interface.

10. A method, comprising:

providing, on a client device of a client instance comprising a plurality of virtual machines configured to provide services of the client instance to the client device, a chat interface of a service application configured to support management of the plurality of virtual machines of the client instance;

determining, via the service application, an identity of a user associated with the client device;

providing, via the chat interface, a list of selectable topic descriptors representing a plurality of information technology (IT) management topics associated with the management of the plurality of virtual machines, wherein the list of selectable topic descriptors is determined based at least in part on the identity of the user, and wherein different user identities of a plurality of user identities are provided different selectable topic descriptors associated with the management of different sets of virtual machines of the plurality of virtual machines;

receiving, via the chat interface, a selection of a topic descriptor from the list of selectable topic descriptors, and in response, determining a plurality of IT management operations associated with a particular topic represented by the selected topic descriptor, wherein the plurality of IT management operations comprise management operations associated with the plurality of virtual machines;

providing, via the chat interface, a list of selectable operation descriptors representing the plurality of IT management operations;

receiving, via the chat interface, a selection of an operation descriptor from the list of selectable operation descriptors, and in response, determining a set of virtual machines of the plurality of virtual machines associated with a particular operation represented by the selected operation descriptor;

providing, via the chat interface, a list of selectable virtual machine descriptors representing the set of virtual machines;

receiving, via the chat interface, a selection of a resource descriptor from the list of selectable virtual machine descriptors, wherein the selected virtual machine descriptor represents a particular virtual machine of the set of virtual machines; and performing, via the service application, the particular operation on the particular virtual machine.

11. The method of claim 10, wherein the plurality of IT management operations associated with the particular topic is determined based at least in part on the identity of the user, wherein different user identities are provided different IT management operations associated with the particular topic.

12. The method of claim 10, wherein the set of virtual machines associated with the particular operation is determined based at least in part on the identity of the user, wherein different user identities are provided different sets of virtual machines associated with the particular operation.

13. The system of claim 1, wherein the service application is configured to:

in response to receiving the selection of the operation descriptor, determine a plurality of IT resources associated with the first set of virtual machines and the particular operation represented by the selected operation descriptor;

provide, via the chat interface, a list of selectable resource descriptors representing the plurality of IT resources;

receive, via the chat interface, a selection of a resource descriptor from the list of selectable resource descriptors, wherein the selected resource descriptor represents a particular IT resource of the plurality of IT resources; and perform the particular operation on the particular IT resource.

14. The system of claim 6, wherein the service application is configured to:

in response to receiving the selection of the operation descriptor, determine a plurality of IT resources associated with the first set of virtual machines and the particular operation represented by the selected operation descriptor;

provide, via the chat interface, a list of selectable resource descriptors representing the plurality of IT resources;

receive, via the chat interface, a selection of a resource descriptor from the list of selectable resource descriptors, wherein the selected resource descriptor represents a particular IT resource of the plurality of IT resources; and perform the particular operation on the particular IT resource.

15. The system of claim 1, wherein at least one virtual machine of the plurality of virtual machines comprises a virtual database server.

16. The system of claim 1, wherein at least one virtual machine of the plurality of virtual machines comprises a virtual application server comprising one or more applications managed by the service application.

17. The system of claim 1, wherein the operations further comprise determining a subset of the plurality of IT management operations based at least in part on the identity of the user, wherein the identity of the user comprises permissions for the subset of the plurality of IT management operations, wherein the different user identities of the plurality of user identities comprise different permissions for the plurality of IT management operations, and wherein the list of selectable operation descriptors represents the subset of the plurality of IT management operations.

18. The system of claim 1, wherein performing the particular operation on the first set of virtual machines comprises performing the particular operation in an application hosted by the first set of virtual machines.

19. The system of claim 1, wherein the plurality of IT management operations associated with the particular topic is determined based at least in part on the identity of the user, wherein the different user identities are provided different IT management operations associated with the particular topic.

20. The system of claim 6, wherein the service application is configured to:
- in response to receiving the selection of the operation descriptor from the list of selectable operation descriptors, determine a subset of the first set of virtual machines associated with a particular operation represented by the selected operation descriptor, wherein the subset of the first set of virtual machines is based at least in part on the identity of the user;
- provide, via the chat interface, a list of selectable virtual machine descriptors representing the subset of the first set of virtual machines;
- receive, via the chat interface, a selection of a resource descriptor from the list of selectable virtual machine descriptors, wherein the selected resource descriptor represents a particular virtual machine of the subset of the first set of virtual machines; and
- perform the particular operation on the particular virtual machine.

* * * * *